United States Patent
Maglietta et al.

(10) Patent No.: US 9,474,171 B2
(45) Date of Patent: Oct. 18, 2016

(54) BATTERY WRAP

(71) Applicant: LINCOLN GLOBAL, INC., City of Industry, CA (US)

(72) Inventors: Donald F. Maglietta, Novelty, OH (US); Darren Stockton, Newbury, OH (US); Bryan Scott Burkhart, Chardon, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 355 days.

(21) Appl. No.: 14/103,231

(22) Filed: Dec. 11, 2013

(65) Prior Publication Data

US 2015/0072182 A1    Mar. 12, 2015

Related U.S. Application Data

(60) Provisional application No. 61/876,809, filed on Sep. 12, 2013.

(51) Int. Cl.

| | |
|---|---|
| *H01M 2/02* | (2006.01) |
| *H01M 2/04* | (2006.01) |
| *H01M 2/06* | (2006.01) |
| *H05K 5/02* | (2006.01) |
| *B23K 9/10* | (2006.01) |
| *B23K 9/32* | (2006.01) |
| *H01M 2/10* | (2006.01) |
| *H01M 10/658* | (2014.01) |
| *H01M 10/48* | (2006.01) |

(52) U.S. Cl.
CPC ............... *H05K 5/0213* (2013.01); *B23K 9/10* (2013.01); *B23K 9/32* (2013.01); *H01M 2/1072* (2013.01); *H01M 2/1094* (2013.01); *H01M 10/486* (2013.01); *H01M 10/488* (2013.01); *H01M 10/658* (2015.04)

(58) Field of Classification Search
USPC ............... 429/61–64, 90–93, 120, 163–187; 206/703; 221/282
See application file for complete search history.

(56) References Cited

U.S. PATENT DOCUMENTS

| | | | |
|---|---|---|---|
| 4,660,610 | A | 4/1987 | McIntire, III |
| 7,045,236 | B1 | 5/2006 | Andrew et al. |
| 8,080,761 | B2 | 12/2011 | Matthews et al. |
| 8,152,367 | B2 | 4/2012 | Roberts et al. |
| 8,485,387 | B2 | 7/2013 | Bowers et al. |
| 2007/0212597 | A1 | 9/2007 | Herlinger |
| 2008/0311466 | A1 | 12/2008 | Yang et al. |

FOREIGN PATENT DOCUMENTS

| | | |
|---|---|---|
| CN | 202817055 | 3/2013 |
| DE | 19614435 | 10/1997 |
| DE | 102007041700 | 7/2009 |
| EP | 2323193 | 5/2011 |
| EP | 2615659 | 7/2013 |
| FR | 2705085 | 12/1993 |
| GB | 2213981 | 8/1989 |
| JP | S62234878 | 10/1987 |
| JP | H05318117 | 3/1993 |
| WO | 2013082439 | 6/2013 |

OTHER PUBLICATIONS

PCT/IB2014/001815—International Search Report and Written Opinion of the International Searching Authority mailed Feb. 25, 2015.

*Primary Examiner* — Basia Ridley
*Assistant Examiner* — Caitlin Wilmot
(74) *Attorney, Agent, or Firm* — Pearne & Gordon LLP

(57) ABSTRACT

The invention described herein generally pertains to batteries for a welding operation having insulating structure thereabout. Particularly, various welding batteries can be provided one one or more battery wraps that can be opened or closed to increase or decrease the insulating effect thereof. In some embodiments, battery wraps can be integrated with batteries used in hybrid welders.

18 Claims, 15 Drawing Sheets

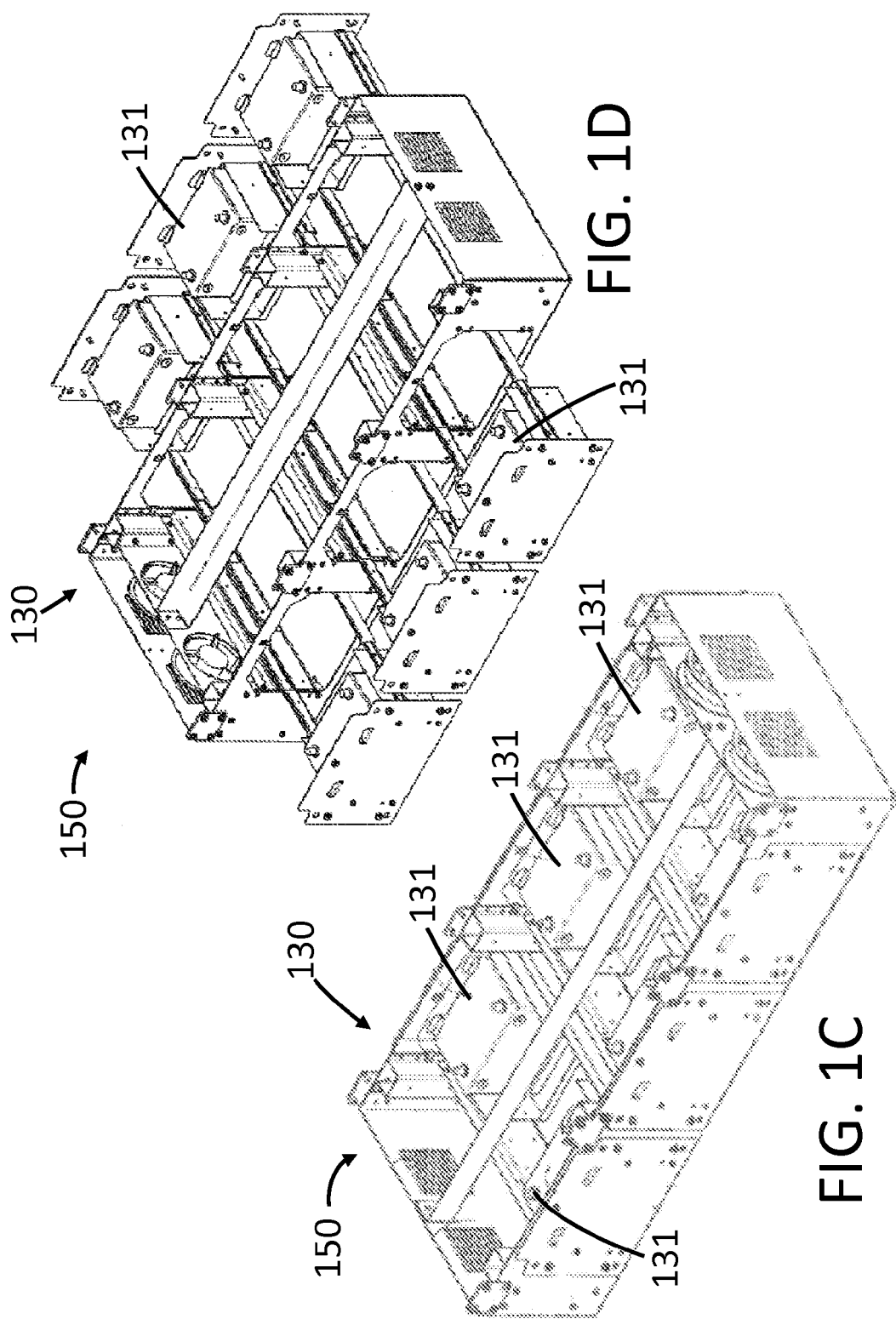

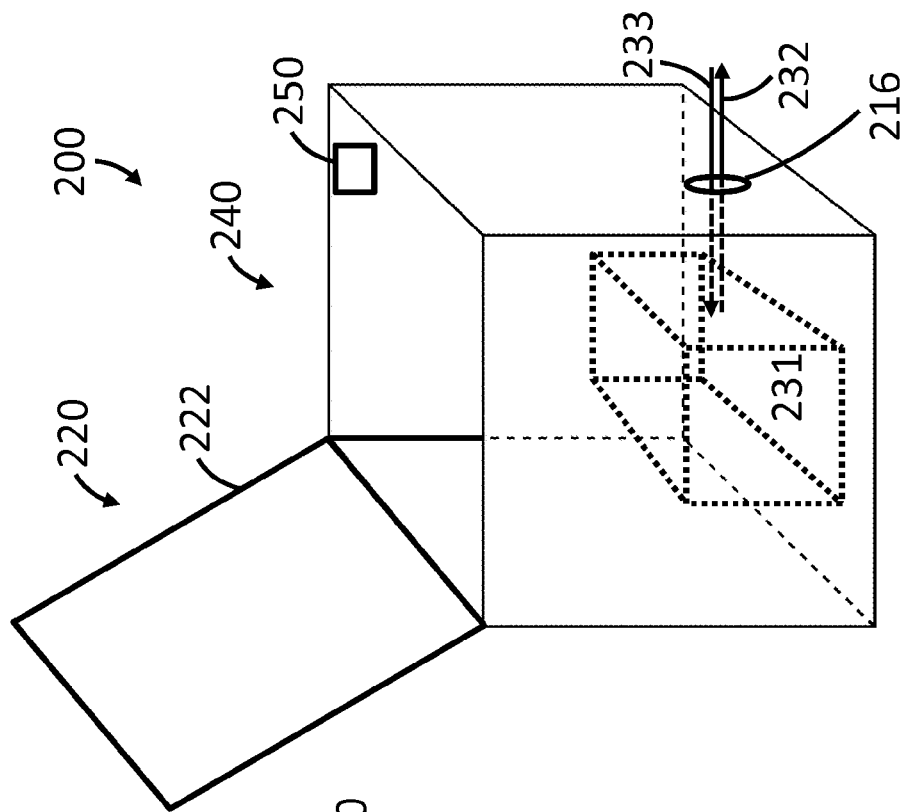
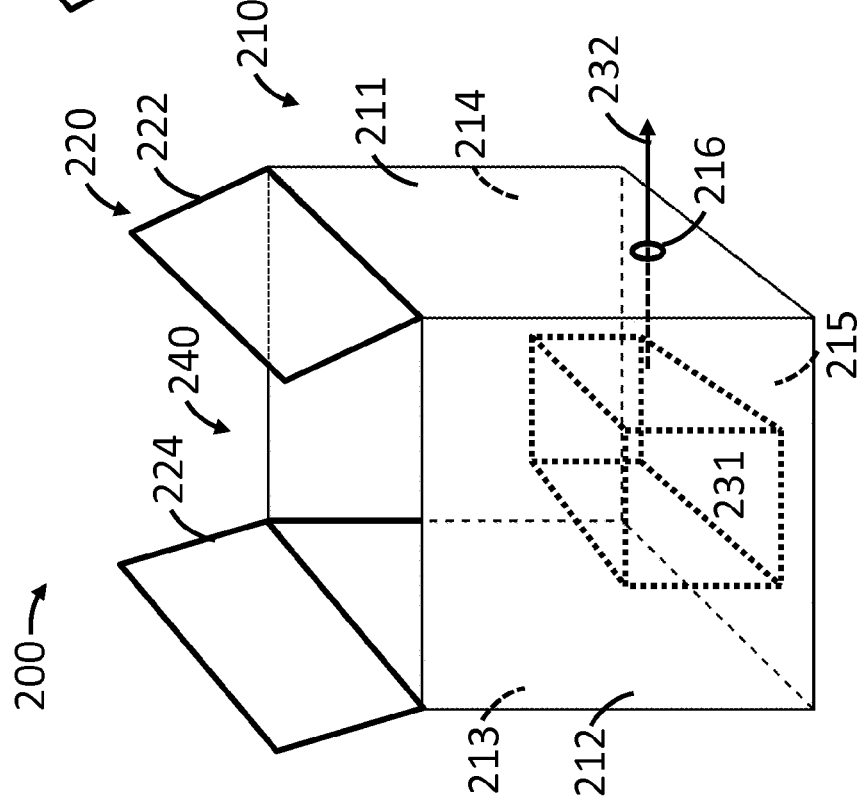

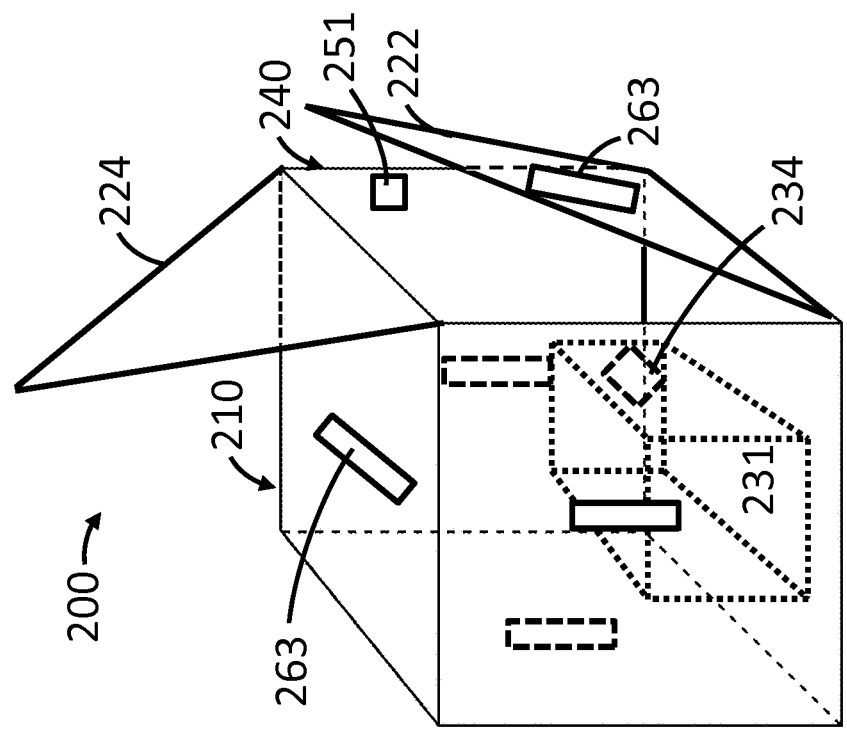
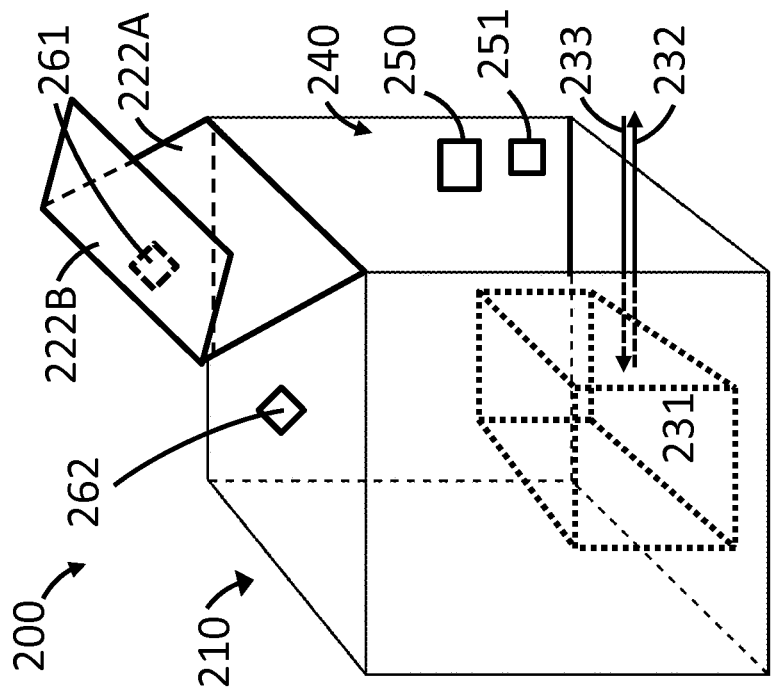

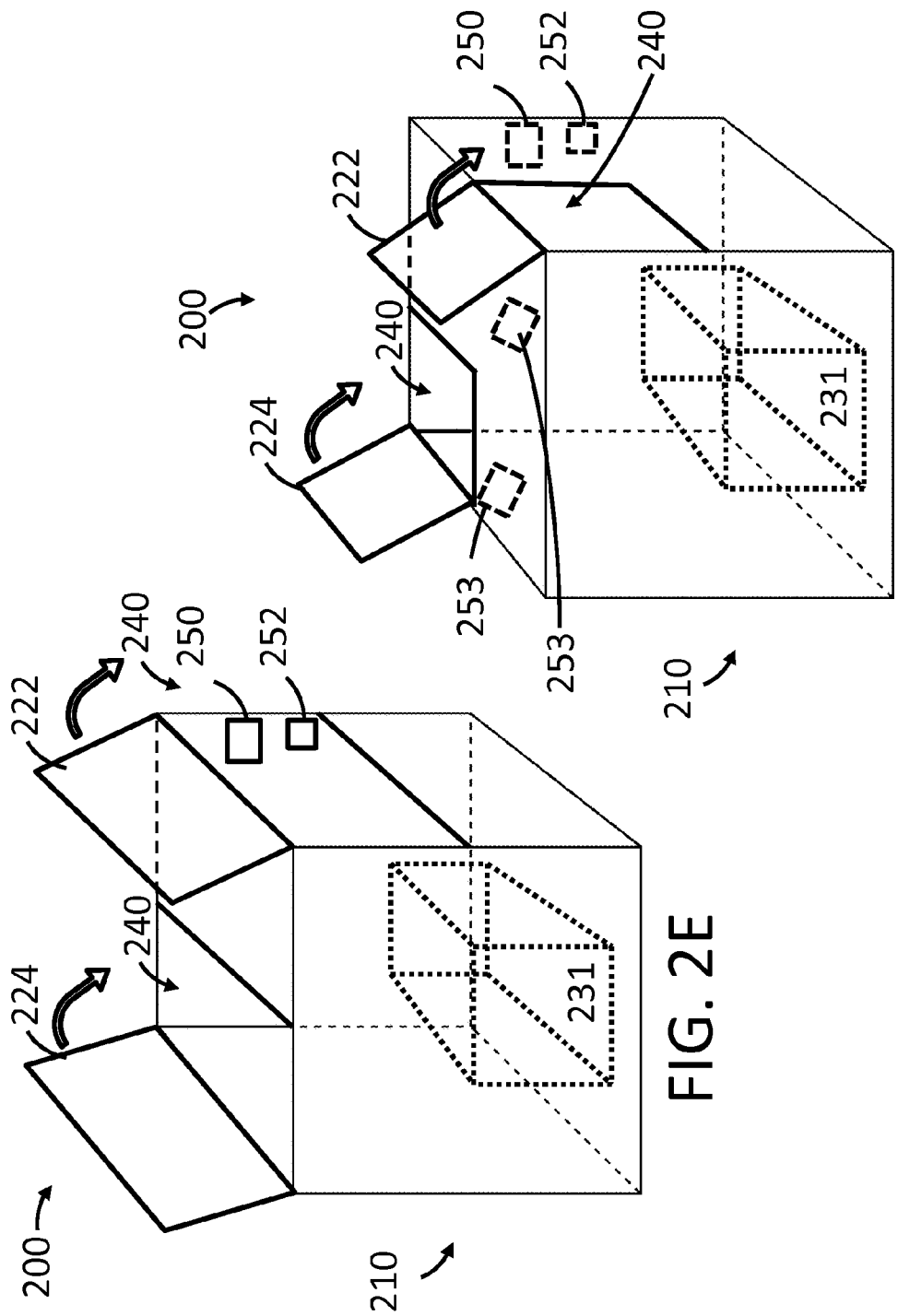

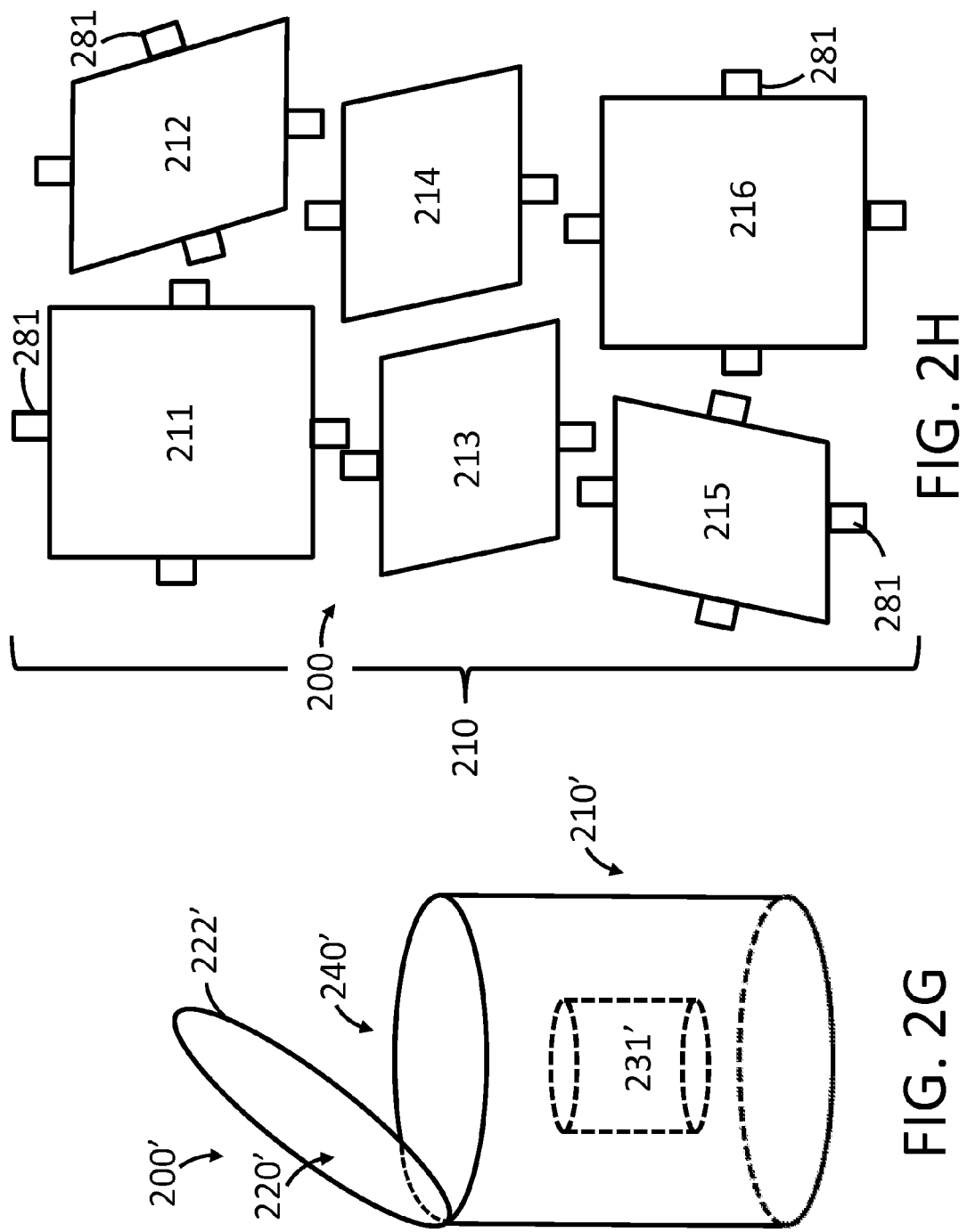

BATTERY WRAP

CROSS-REFERENCE TO RELATED APPLICATIONS AND INCORPORATION BY REFERENCE

This U.S. patent application is a continuation of and claims the benefit of U.S. provisional patent application 61/876,809 filed on Sep. 12, 2013, which is incorporated herein by reference in its entirety.

TECHNICAL FIELD

Devices, systems, and methods consistent with the invention relate generally to welding equipment, and more particularly, to batteries for powering welding equipment, and still more particularly to integrating insulating apparatuses with batteries for power welding equipment.

BACKGROUND OF THE INVENTION

Many devices including hybrid welders utilize batteries that operate best within specific temperature ranges. If a battery is not kept above a minimum temperature of the operating range, the battery may fail to supply adequate power. If the battery exceeds a maximum temperature of the operating range, it can discharge too quickly or otherwise result in inefficient use of its limited capacity.

In order to limit the effects of the external environment on a battery's temperature, various insulation techniques can be employed. However, when a battery is insulated, it may be kept cooler than a hot environment, or colder than a hot environment, but if the battery leaves its optimal range the insulation can prevent the transmission of heat in or out which could help the battery return to an operating state.

SUMMARY OF THE INVENTION

In accordance with the present invention, there is provided a system for controlling an insulation level to a welding component. The system comprises one or more insulating panels disposed about the welding component configured to thermally isolate the welding component from an external environment, the one or more insulating panels defining an opening through which an insulated area can be accessed. The system also includes at least one movable access panel configured to open or close at least a portion of the opening, the movable access panel further configured to insulate the welding component when in a closed position. Finally, the system incorporates a power aperture through at least one of the one or more insulating panels configured to feed a cable through the at least one of the one or more insulating panels.

In accordance with the present invention, there is provided a battery bank, comprising a plurality of batteries of the battery bank configured to provide power to a welding operation. The battery bank also includes one or more insulating battery wraps at least partially configured to at least partially surround the plurality of batteries of the battery bank. The battery bank additionally incorporates one or more movable access panels of the insulating battery wrap configured to open or close at least a portion of the opening, the one or more movable access panels further configured to insulate the welding component when in a closed position, and one or more electrical feedthroughs configured to permit electrical communication with the plurality of batteries when the one or more movable access panels are closed.

Further, in accordance with the present invention, there is provided a method for controlling an insulating battery wrap having a movable access panel. The method includes determining one or more battery bank temperatures related to at least one battery in a battery bank. The method also includes evaluating the one or more battery bank temperatures with respect to an operating temperature range. The method additionally comprises generating a control signal related to opening or closing a battery wrap in response to the evaluation of the one or more battery bank temperatures with respect to the operating temperature range.

These and other objects of this invention will be evident when viewed in light of the drawings, detailed description, and appended claims.

BRIEF DESCRIPTION OF THE DRAWINGS

The above and/or other aspects of the invention will be more apparent by describing in detail exemplary embodiments of the invention with reference to the accompanying drawings, in which:

FIGS. 1A-1D are diagrams illustrating a hybrid welding device;

FIGS. 2A-2H depict example embodiments of an insulating battery wrap;

DETAILED DESCRIPTION

Figure 1B:
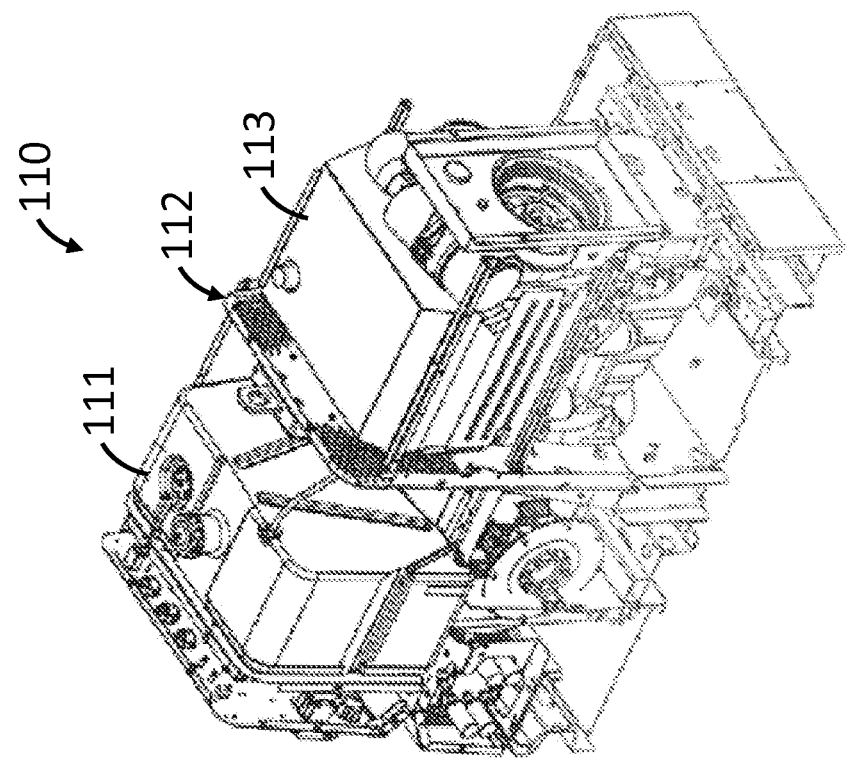
Figure 1A:
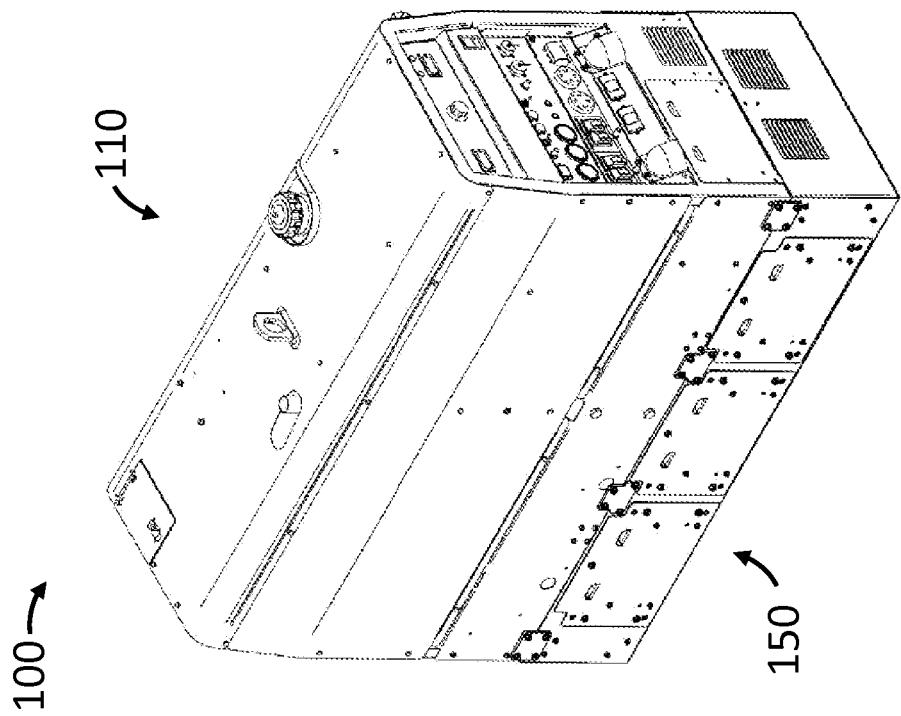

Embodiments of the invention will now be described below by reference to the attached figures. The described embodiments are intended to assist the understanding of the invention, and are not intended to limit the scope of the invention in any way. Like reference numerals refer to like elements throughout.

In accordance with aspects herein, a battery can be provided for an insulating battery wrap that can be opened or closed depending on whether the battery is above or below an optimal operating temperature range. One or more sides of the wrap can be opened in a variety of fashions.

While various illustrations herein depict hinge-type connections where a door swings, pivots, or rotates about a point to open a portion of wall, it is understood that opening and closing portions of an insulating battery wrap can move by sliding, rolling, folding, collapsing, or other mechanisms, or combinations thereof. Further, while hinge-type connections are shown as providing full rotation until contact with another portion of the insulating battery wrap, it is understood that various dampeners, flexible or jointed support members, or A-frame type structures can be employed to open the insulating battery wrap to one or more specific points, and secure a portion of the wrap thereabout.

An insulating battery wrap can generally include one or more insulating panels or sheets that surround or block at least a portion of a battery for insulating purposes. At least a portion of the insulating battery wrap can be opened, closed, or otherwise moved to change the insulating effects on at least a portion of the battery. Various parts of the insulating battery wrap can be rigid or flexible, and constructed of various materials. While the drawings depict insulating battery wraps as completely surrounding the batteries when closed, it is understood that embodiments may only insulate one side, or a portion thereof, and may be placed into an open configuration such that none or nearly none of the battery is insulated.

Opening or closing a battery wrap can change an insulation level. An insulation level can be a relative, absolute, or combination metric. For example, an insulation level can be related to heating or cooling times, amount of airflow permitted, measures of thermal resistance for particular portions or for an entire wrap, and so forth.

Aspects discussed herein are equally applicable to (and can be utilized in) systems and methods related to arc welding, laser welding, brazing, soldering, plasma cutting, waterjet cutting, laser cutting, and any other systems or methods using similar control methodology, without departing from the spirit or scope of the discussed inventions. The embodiments and discussions herein can be incorporated into any such systems and methodologies by those of skill in the art on review of the disclosures. Devices or components associated with welding operations, including batteries used in such operations, are referred to herein as "welding components."

FIGS. 1A-1D illustrate a hybrid welding device (herein referred to as a "hybrid welder"). A hybrid welder according to the invention is generally indicated by the number 100 in the drawings. Hybrid welder 100 includes an engine portion 110 and energy storage portion 150. Hybrid welder 100 includes an engine component that runs on fuel from fuel storage 111 allowing the hybrid welder 100 to be portable. It will be appreciated that hybrid welder 100 may also be mounted in a permanent location depending on the application. Hybrid welder 100 generally includes a motor-driven welder assembly 112 having a motor 113 and an energy storage device 150. Motor 113 may be an internal combustion engine operating on any known fuel including but not limited to gasoline, diesel, ethanol, natural gas, hydrogen, and the like. These examples are not limiting as other motors or fuels may be used.

The motor 113 and energy storage device 150 may be operated individually or in tandem to provide electricity for the welding operation and any auxiliary operations performed by hybrid welder 100. For example, individual operation may include operating the motor 113 and supplementing the power from the motor 113 with power from the energy storage device 150 on an as needed basis. Or supplying power from the energy storage device 150 alone when the motor 113 is offline. Tandem operation may also include combining power from motor 113 and energy storage device 150 to obtain a desired power output. According to one aspect of the invention, a welder 100 may be provided with a motor having less power output than ordinarily needed, and energy storage device 150 used to supplement the power output to raise it to the desired power output level.

In an embodiment, a motor with no more than 19 kW (25 hp) output may be selected and supplemented with six 12 volt batteries. Other combinations of motor output may be used and supplemented with more or less power from energy storage device. The above example, therefore, is not limiting.

Energy storage device 150 may be any alternative power source including a secondary generator, kinetic energy recovery system, or, as shown, one or more batteries 131. Batteries 131 can be maintained in a battery bank 130 that electrically integrates batteries 131. Batteries 131 can be accessed in battery bank 130 using various movable members. In an embodiment, six 12 volt batteries 131 are wired in series to provide power in connection with motor-driven welder assembly 112. Batteries 131 shown are lead acid batteries. Other types of batteries may be used including but not limited to NiCd, molten salt, NiZn, NiMH, Li-ion, gel, dry cell, absorbed glass mat, and the like.

Modes for carrying out the invention will now be described for the purposes of illustrating embodiments known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 2-8 illustrate at least aspects discussed in FIGS. 1A-1D in schematic block diagram form.

FIGS. 2A-2H depict example embodiments of an insulating battery wrap 200. FIGS. 2A-2G show battery 231 in insulating battery wrap 200. Battery 231 need not be of any particular size or shape, and may not be shown to scale.

Insulating battery wrap 200 includes wrap portion 210 and insulated portion 240. Wrap portion 210 includes side panels 211, 212, 213, 214, and 215. Side panels 211, 212, 213, 214, and 215 are composed of suitable insulating materials and are substantially planar structures generally forming a box-shape. Side panels 211, 212, 213, 214, and 215 can be permanently attached to one another or detachable from one another. In some embodiments, some of side panels 211, 212, 213, 214, and 215 are permanently fixed to one another and others are detachable. Where one or more of side panels 211, 212, 213, 214, and 215 is detachable, any suitable temporary attachment means (e.g., hook-and-loop, zippers, buttons, snaps, latches, magnets, screws, pins, and other mating or connecting components) may be utilized.

Insulated portion 240 includes areas covered on at least one side by wrap portion 210. Put another way, insulated portion 240 is a space defined at least in part by wrap portion 210, and specifically the space that can contain a battery for insulating. Insulating portion 240 can include battery 231. In some embodiments, battery 231 can be a battery used in a welding operation or to power welding equipment. Battery 231 can include output 232 to provide power (e.g., for the welding operation).

In some embodiments, wrap portion 210 includes power aperture 216 through which one or more cables can pass to allow battery output 232 to connect to a load. In some embodiments, power aperture 216 is configured to support the insulating effects of wrap portion 210 by restricting airflow or including its own insulating properties. In some embodiments, power aperture 216 includes a built-in cable portion or cable conduit; is built about a cable associated with battery output 232; includes a hermetic seal; or includes various self-sealing components that re-close upon installation of battery output 232.

Insulated battery wrap 200 further includes movable portion 220. Movable portion 220 includes at least one access panel. In FIG. 2A, movable portion 220 includes access panels 222 and 224, which can be moved to open or close battery wrap 200 to increase or reduce its insulating properties. In some embodiments, access panels 222 and 224 can be opened individually or at once, and may be opened entirely or only part-way, such that the insulating effects can be scaled.

FIG. 2B shows an embodiment of insulating battery wrap 200 where movable portion 220 includes a single access panel 222. While access panel 222 is shown disposed toward a top side of wrap portion 210, it is understood that access panel 222 can be provided elsewhere or open/close in other fashions.

Further, wrap portion 210 includes power aperture 216 that facilitates two-way power supplying such that battery 231 can provide power for welding operations and be recharged via battery output 232 and battery input 233, simultaneously or at different times, without reconfiguration. In some embodiments, battery output 232 and battery input 233 can be accomplished using a single cable through a single aperture. In other embodiments, battery output 232 and battery input 233 can utilize two or more cables through one or more through two or more power apertures 216.

Insulating wrap 200 also includes thermometer 250. Thermometer 250 includes at least one thermometer 250 which provides a temperature reading at one or more points in insulated portion 240. Thermometer 250 can be visible (on the inside of wrap portion 210, on the outside of wrap portion 210, or both) to enable an operator to quickly see a temperature reading to be used in a determination to open or close a movable portion 220. In further embodiments, thermometer 250 can generate an signal, or be used in conjunction with a component that generates a signal, for use with various electronic components (e.g., local or remote notifications, network communication of statuses, automated control of at least movable portion 220). In some embodiments, insulating battery wrap 200 can include two or more of thermometer 250 in two or more locations or to provide a redundant backup in the event one is inoperable.

FIG. 2C illustrates insulating battery wrap 200 having a movable portion 220 disposed toward a side of wrap portion 210, whereby the access panel has a first folding portion 222A and a second folding portion 222B. Wrap portion 210 does not include an aperture for battery output 232 and battery input 233 to pass through, but instead routes these portions through the opening of movable portion 220. In some embodiments, movable portion 220 can simply lay against one or both of battery output 232 and battery input 233. In alternative or complementary embodiments, one or more radiuses (not illustrated) can be cut into an end of movable portion 220 (e.g., the end of second folding portion 222B) to facilitate closure of movable portion 220 with battery output 232 and/or battery input 233 routed through the opening defined at least in part by movable portion 220.

Insulating battery wrap 200 can include securing apparatus 261 to secure movable portion 220 in one or more positions. In an embodiment, movable portion 220 can be locked open in one or more positions using securing apparatus 261. Securing apparatus 261 can connect to a mating portion 262, or operate by itself. In some embodiments, securing apparatus 261 can lock movable portion 220 in a closed position in addition to or alternative to an open position. Additionally, securing apparatus 261 may serve as a knob, latch, snap, et cetera, which must be manipulated to open or close movable portion 220.

Insulating battery wrap 200 can additionally include communication component 251. Communication component 251 can (but need not) transmit information related to thermometer 250. In some embodiments, communication component 251 transmits temperature information to a remote computer, a welding device, or another component. Communication component 251 can be wired or wireless, and utilize various communication technologies and protocols known in the art.

FIG. 2D illustrates insulating battery wrap 200 where movable portion 220 includes access panels 222 and 224. Access panels 222 and 224 are angled and triangular as opposed to having a quadrilateral form. As will be understood, this is just one additional embodiment of movable portion 220, and other configurations can be utilized (e.g., 3-triangle, 4-triangle, two-triangle and quadrilateral, overlapping portions).

Battery 231 can include a battery monitor 234. Battery monitor 234 can provide battery parameter information related to charge status, battery temperature (alone or in combination with another thermometer, cell health (e.g., indicate degraded or unserviceable cells), overall battery health, and other information. Battery monitor 234 can leverage communication component 251, or include integrated or operatively coupled alternative wired or wireless communication means, to provide battery information to a local or remote device.

Insulating battery wrap 200 can also include attachment components 263, 264, 265, 266, 267, and 268. Attachment components 263, 264, 265, 266, 267, and 268 can be on one or more sides of wrap portion 210 and facilitate securing insulating battery wrap in a position to an external structure (e.g., on a vehicle for use or transport, on a shelf or scaffold, on a dedicated portion of floor or wall). In alternative or complementary embodiments, attachment components 263, 264, 265, 266, 267, and 268 can be utilized for handling insulating battery wrap 200 in an empty state or with one or more batteries therein.

FIG. 2E illustrates insulating battery wrap 200 where movable portion 220 includes access panels 222 and 224 on different sides of wrap portion 210. This can permit dual-access to multiple portions of insulated area 240. In addition, multiple access panels on multiple sides may improve airflow during open use of insulating battery wrap 200.

Insulating battery wrap 200 can further include control component 252. Control component 252 can utilize information from thermometer 250 or external signals to control at least a portion of battery wrap 200. For example, control component 252 can display locally or send to a remote device an open notification (e.g., temperature exceeds operating range), a close notification (e.g., temperature below optimal operating range), or another notification or command. In some embodiments, control component can simply be used to provide information (e.g., a measured temperature or temperature gradient) to another component or entity for action. Such entities can be at least one external entity, or an entity not within the system. An external entity can be a local or remote operator, or a local or remote device including logic for taking action in response to the notification.

FIG. 2F illustrates insulating battery wrap 200 where moveable portion 220 includes access panels 222 and 224 that take up a smaller proportion of the face of a respective side panel. In some embodiments, access panels 222 and 224 can be opened or closed simultaneously or individually, and may be opened differing amounts (e.g., space through which air can pass smaller, different angle of rotation, different amount of opening covered). In some embodiments, four access panels adjacent to one another.

Insulating battery wrap 200 can further include control motors 253. In some embodiments, thermometer 250 can provide temperature information from one or more locations to control component 252. Control component 252 can, based on the temperature information, determine an appropriate position for access panels 222 and 224. In some embodiments, control component 252 bases its determinations on not only an instantaneous temperature, but also historical temperature data, rate of temperature change, and other derivative or combined values. Signals from control component 252 can be provided to one or both of access panels 222 and 224 to determine appropriate respective positions for the access panels. Control motors 253 can, through mechanical linkages with access panels 222 and 224, open or close insulated area 240 by moving one or both of access panels 222 and 224 to a particular location.

FIG. 2G illustrates insulating battery wrap 200' in a cylindrical fashion. Insulating battery wrap 200' provides an example of an embodiment not utilizing a box-shaped wrap portion 210'. In some embodiments, wrap portion 210' can be potentially any shape, and in some embodiments can be asymmetrical or irregular shapes.

FIG. 2H illustrates insulating battery wrap 200 in a disassembled state whereby side panels 211, 212, 213, 214, 215, and 216 include attaching members 281 allowing side panels 211, 212, 213, 214, 215, and 216 to removably attach to one another at one or more points. As attaching members 281 are removable, any one of attaching members 281 may be de-coupled from another in various embodiments, permitting any one (or more) of side panels 211, 212, 213, 214, 215, and 216 to become a movable portion to open or close insulating battery wrap 200.

Figure 3:
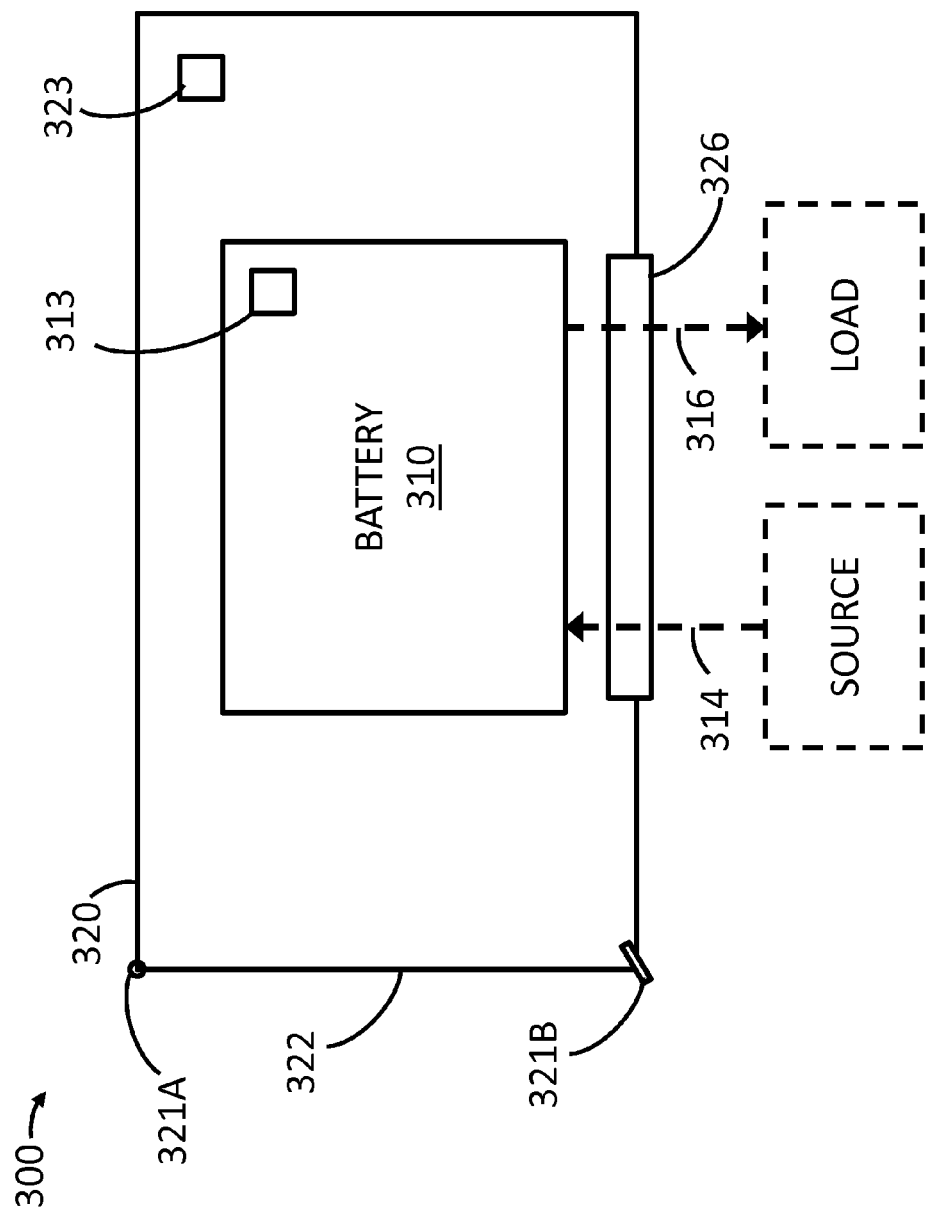
FIG. 3 illustrates an embodiment of an insulated battery system in block diagram form.

Turning now to FIG. 3, illustrated is an insulated battery system 300 shown in block diagram form. Insulated battery system 300 is shown in a single-battery configuration where battery 310 is at least partially surrounded by battery wrap 320. Battery wrap 320 includes at least one movable access panel 322 which can open, close, be removed, or otherwise change an amount of insulation affecting at least a portion of battery 310.

Access panel 322 includes pinned connection 321A and detachable portion 321B. Detachable portion 321 permits access panel 322 to detach from a portion of one or more side panels and open from a closed position. Pinned connection 321A retains access panel 322 such that access panel 322 remains attached to one or more side panels when open.

Battery wrap 320 can, in some embodiments, include thermometer 323. Thermometer 323 can be one or more thermometers providing temperature information at one or more points about battery wrap 320. Battery wrap 320 can further include feedthrough 326 which can permit at least one output 314 or input 316 to access battery 310 through battery wrap 320.

Battery 310 can further include thermometer 313. Thermometer 313 can provide temperature information related to battery 310. Various embodiments can permit combinations of thermometer 313 and thermometer 323 to provide accurate temperature information regarding the battery 310 and/or areas about battery wrap 320. In specific embodiments, one or both of thermometer 313 and thermometer 323 can be coupled to a communication means that transmits temperature information to another component, device, or user.

Figure 4:
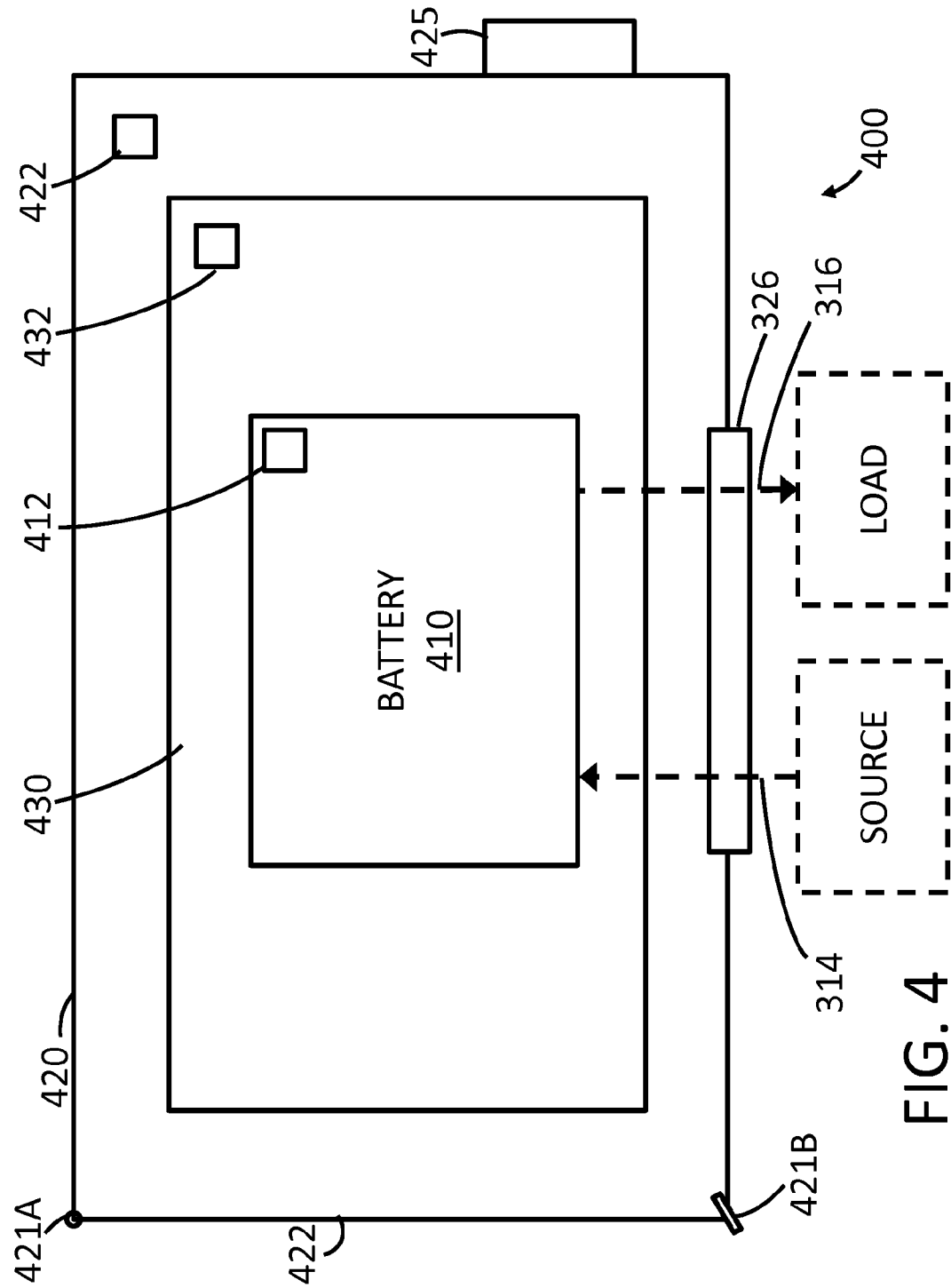
FIG. 4 illustrates an embodiment of an insulated battery system in block diagram form.

Turning now to FIG. 4, illustrated is an insulated battery system 400 shown in block diagram form. Insulated battery system 400 includes battery cradle 430. Battery cradle 430 connects electrically with battery 410. In some embodiments, battery cradle 430 houses or retains battery 410 and provides interfaces or connections to various loads which discharge battery 410, or power supplies with recharge battery 410. Battery cradle 430 can include its own diagnostic module 432. In some embodiments diagnostic module 432 at least includes a thermometer. In complementary or alternative embodiments, diagnostic module 432 can provide information about battery 410, battery cradle 430, or other components of insulated battery system 400

As illustrated in FIG. 4, battery wrap 420 surrounds battery cradle 430. However, in alternative or complementary embodiments, battery wrap 420 can surround battery 410 in portions not surrounded by battery cradle 430, or can fit within battery cradle 430 to wrap battery 410 while integrated in battery cradle 430. In still further embodiments, battery wrap 420 and battery cradle 430 can be combined such that the cradle includes insulating features including access panel 422.

In specific embodiments, insulated battery system 400 further includes display module 425 which displays a notification. A notification can include, for example, energizing or de-energizing an illuminated signal, enabling or disabling an audible alarm, displaying a message, and other indicators. Notifications can provide an indication to open or close the system.

Figure 5:
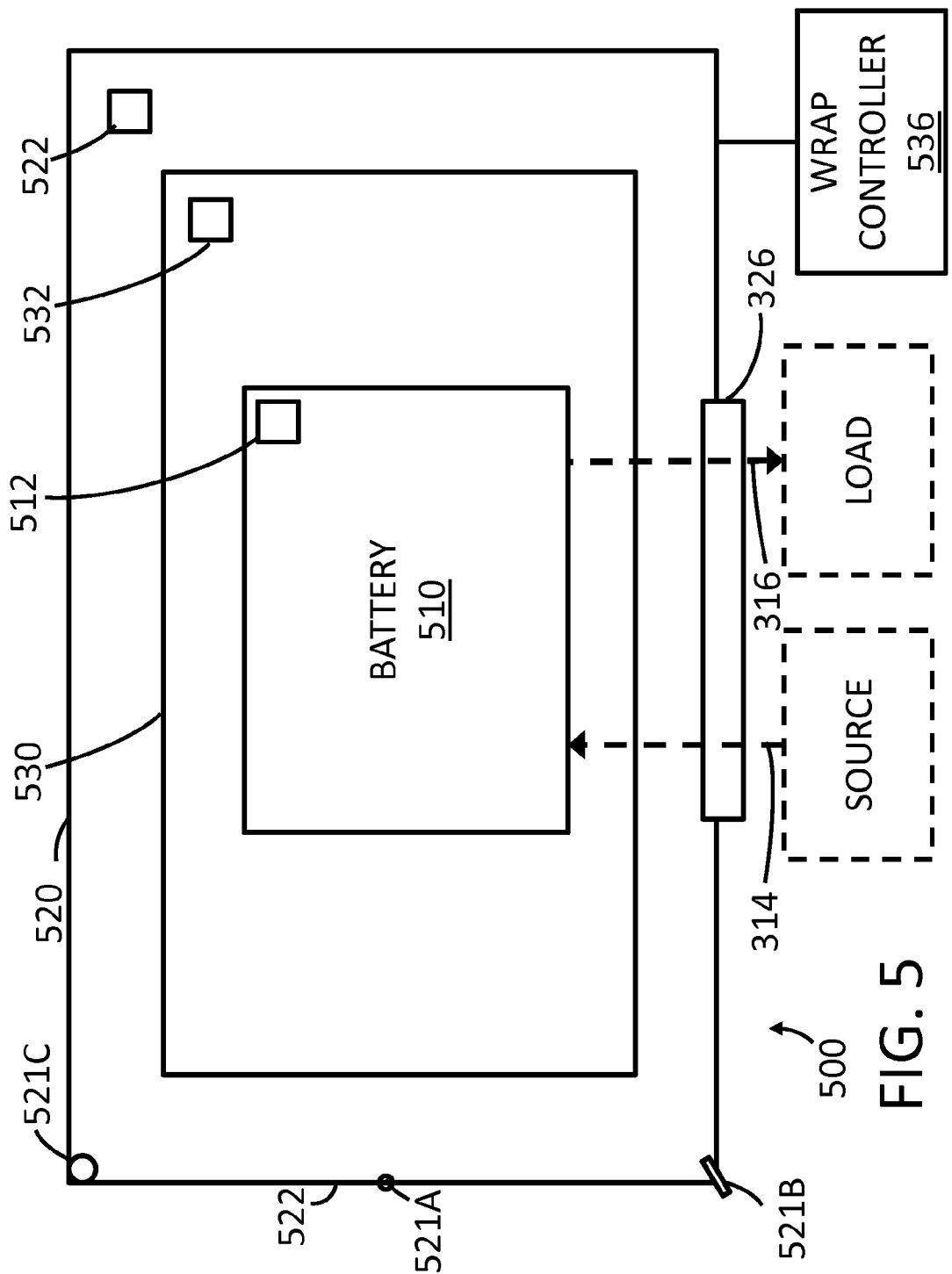
FIG. 5 illustrates an embodiment of an insulated battery system in block diagram form.

Turning now to FIG. 5, illustrated is an insulated battery system 500 shown in block diagram form. Insulated battery system 500 can include battery 510 having thermometer 512 and coupled to battery connections 514 and 516. Battery 510 can be placed in battery cradle 530 having thermometer 532. Battery cradle 530 can be surrounded, at least in part, by battery wrap 520.

Insulated battery system 500 can further include wrap controller 536. Wrap controller 536 can utilize information from one or more of thermometer 512, diagnostic module 532, thermometer 523, or other sources to generate control signals related to insulated battery system 500. For example, based on one or more temperatures or other indicators from thermometer 512, diagnostic module 532, thermometer 523, or other temperature measuring devices, wrap controller 536 can generate and/or execute a control signal. A control signal can, for example, generate a notification to a local or remote component to indicate for an operator to open access panel 522. In alternative or complementary embodiments, access panel 522 can be opened or closed based on the control signal.

In FIG. 5, access panel 522 includes jointed portions 522A and 522B. Jointed portions 522A and 522B are hingedly connected or flexible at joint 521A. When access panel 522 is detached at detachable point 521B, access panel 522 can slide about a side panel of battery wrap 520, deflecting at joint 521A to move about one or more corners or battery wrap 520.

Figure 6:
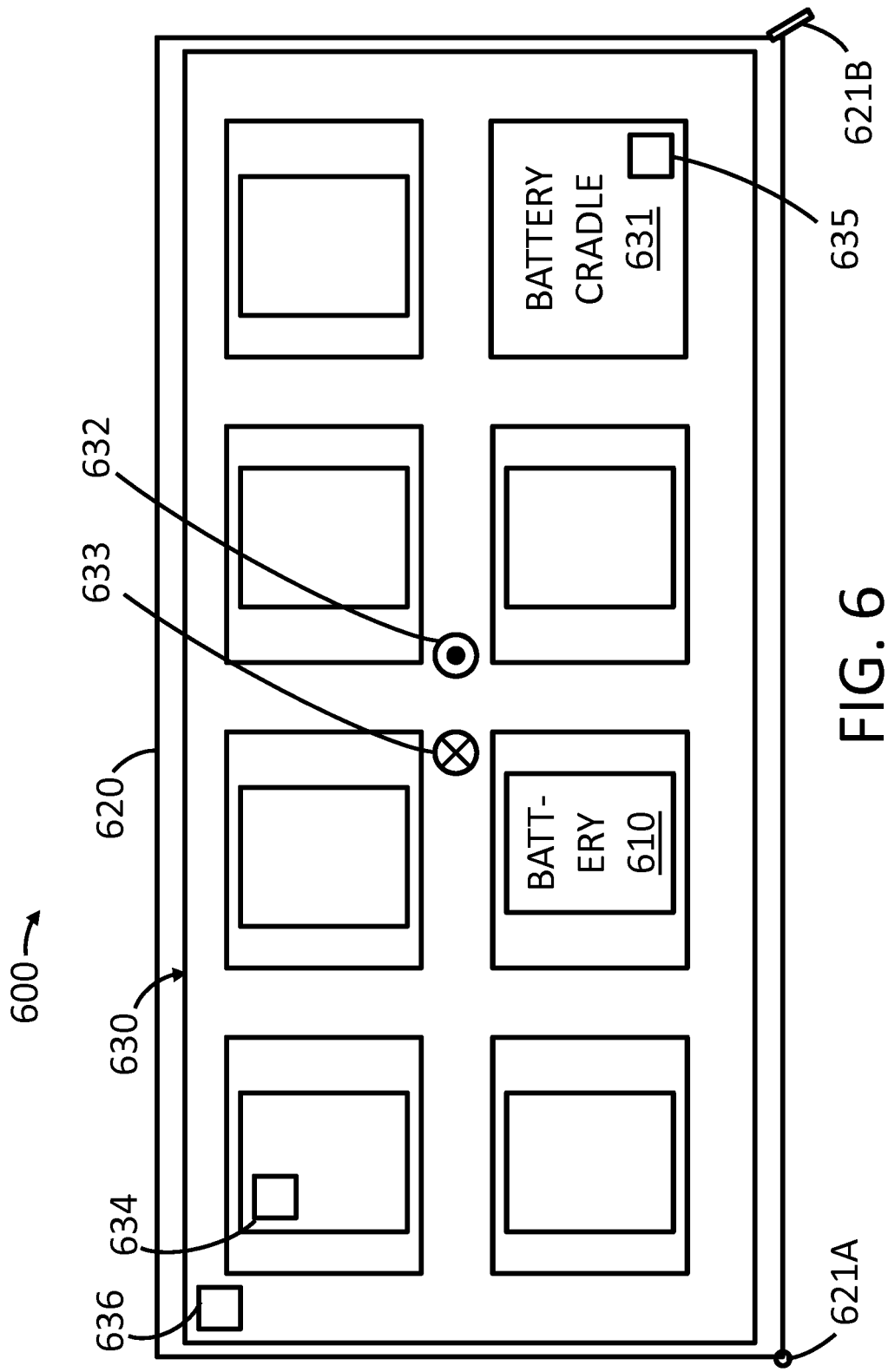
FIG. 6 illustrates an embodiment of an insulated battery system in block diagram form.

Turning now to FIG. 6, illustrated is an insulated battery system bank 600 shown in block diagram form. Insulated battery system bank 600 includes battery bank 630 having a plurality of battery cradles 631. Battery bank 630 can be a group of batteries for use with a hybrid welder (e.g., like bank 150). One or more batteries 610 can be mounted in battery cradles 631. In some embodiments, one of the plurality of battery cradles 631 may mount a single battery 610. In alternative embodiments (not pictured), one of the plurality of battery cradles 631 may mount two or more batteries 610.

The plurality of battery cradles 631 may be arranged in one or more rows and columns, or in any other orientation.

In some embodiments, the plurality of battery cradles 631 can be movable or permit access to batteries 610 when battery bank 630 is integrated in a work setting (e.g., preventing overhead access). Various doors, drawers, or other moving portions can be integrated with battery bank 630 to the accomplishment of such ends.

Battery bank 630 can include various electrical outputs 632 and electrical inputs 633. Electrical outputs 632 and electrical inputs 633 can be provided as a single conduit to a load or source consolidating electrical communication to two or more interconnected battery cradles 631. Alternatively (not illustrated), electrical outputs 632 and electrical inputs 633 can be provided for an individual battery cradle 631, and there can be multiple electrical outputs 632 and/or electrical inputs 633 associated with individual battery cradles 631.

In insulated battery system bank 600, battery wrap 620 can surround the entirety of battery bank 630 about its sides. In some embodiments, insulation of battery wrap 620 can include the top and bottom of battery bank 630. Battery wrap 620 includes jointed portion 621A and detachable portion 621B to permit opening and closing of battery wrap 620.

Insulated battery system bank 600 can include one or all of thermometers 634, 635, and 636 respectively integrated with battery 610, battery cradle 631, and battery bank 630. Thermometers 634, 635, and/or 636 can be single thermometers or multiple thermometers, and need not be confined to the illustrated locations or quantities. Temperature information from thermometers 634, 635, and 636 can be output for viewing, either as a visible physical thermometer or on a powered display. In addition, temperature information from temperature thermometers 634, 635, and 636 can be utilized with control systems.

Figure 7:
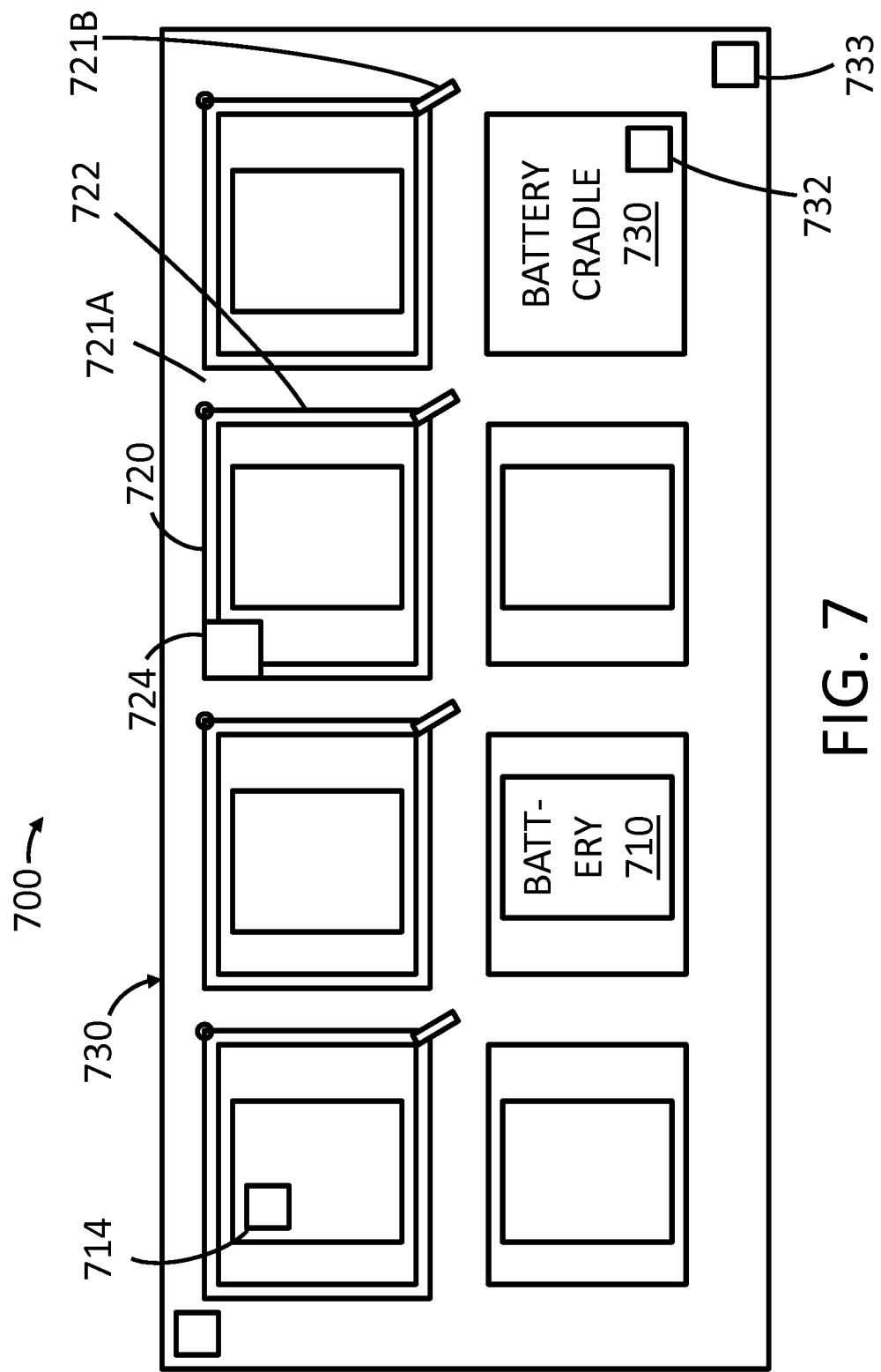
FIG. 7 illustrates an embodiment of an insulated battery system in block diagram form.

Turning now to FIG. 7, illustrated is an insulated battery system 700 shown in block diagram form. In insulated battery system 700, battery cradles 731 are individually provided battery wraps 720. Battery wraps 720 can include movable connection 721A and detachable connection 721B to permit opening of individual battery wraps 720. While views of battery wraps 720 appear that they are side-opening, it is understood that other configurations (e.g., top-opening) can be employed.

As shown in FIG. 7, battery wraps 720 can be applied to a subset of all batteries 710 or battery cradles 731. For example, as illustrated, battery wraps 720 are only applied to one row of battery cradles 731. However, it is understood that any other configuration can be utilized without departing from the scope or spirit of the innovation.

In order to facilitate monitoring of both wrapped and unwrapped batteries 710, various thermometers can be integrated. For example, a bank thermometer 734 can monitor the temperature at one or more locations in battery bank 730. One or more wrap thermometers 724 can monitor the temperature on or inside a battery wrap 720. Further, thermometers 714 and 734 can be integrated within a battery or battery cradle.

Figure 8:
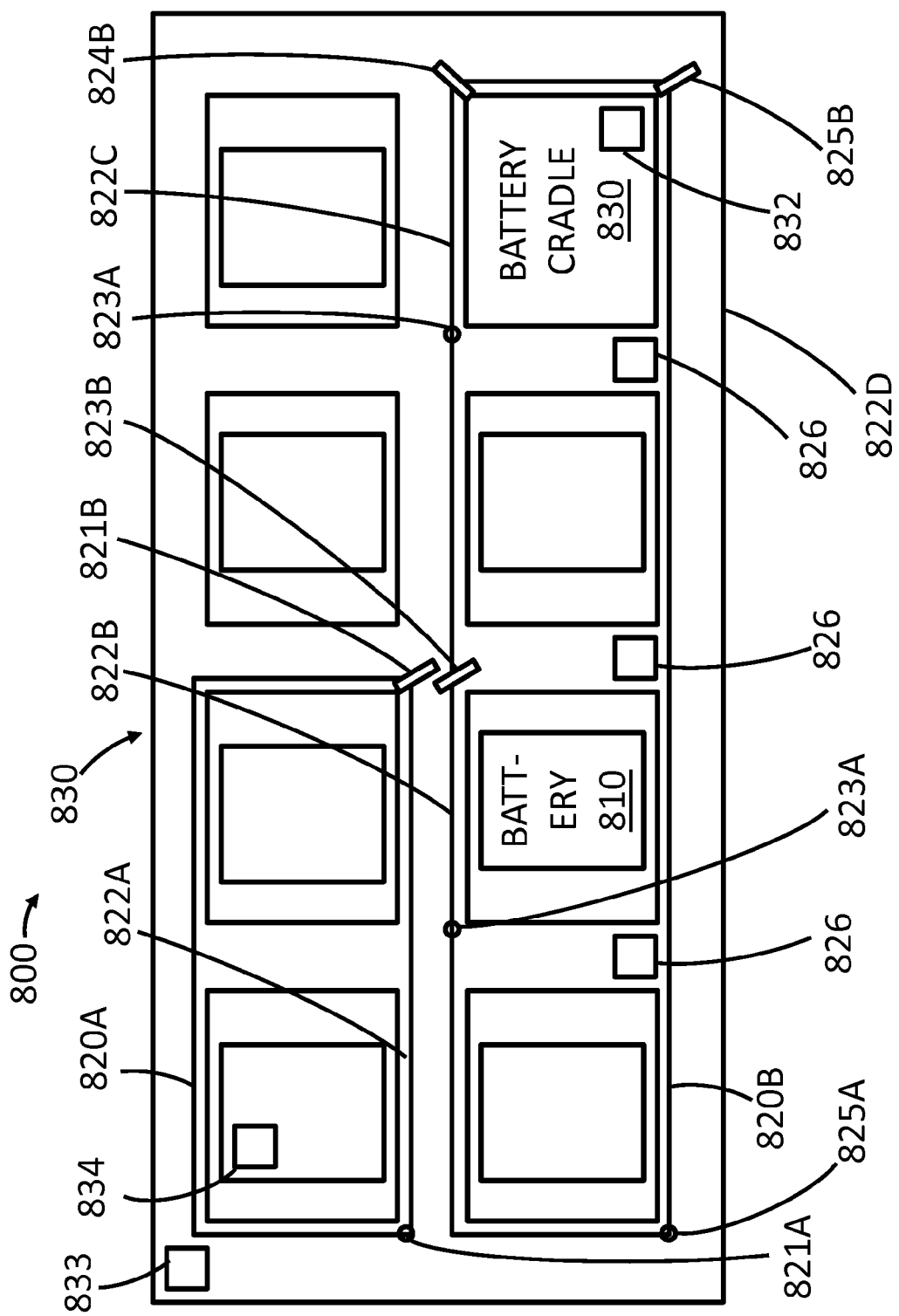
FIG. 8 illustrates an embodiment of an insulated battery system in block diagram form.

Turning now to FIG. 8, illustrated is an insulated battery system 800 shown in block diagram form. As shown in FIG. 8, battery wraps 820A and 820B wrap a subset of batteries 810 or battery cradles 831 in groups of two or more. Battery wrap 820A wraps two batteries, and includes movable connection 721A and detachable connection 721B to open the wrap at one or more locations.

Battery wrap 820B is shown wrapping four battery cradles 831, including at least three batteries 810. Battery wrap 820B includes movable portions 822A, 822B, and 822C that can be opened to reduce insulating effects of battery wrap 820B. Movable portion 822A is defined at least in part by movable connection 823A and detachable connection 823B, and moveable portion 822B is defined at least in part by movable connection 824A and detachable connection 824B. Movable portion 822C is defined at least in part by movable connection 825A and detachable connection 825B.

Portions herein can also include thermometers. For example, battery wrap 820B depicts included three thermometers 823A, 823B, and 823C. As indicated, multiple thermometers can be integrated at more than one position in a single component to provide higher resolution temperature information than may be yielded by a single thermometer.

While various organizations and techniques have been shown with respect to insulating, movable wrapping of batteries in FIGS. 2-8, it is understood that various combinations thereof can be utilized without departing from the scope or spirit of the innovation. For example, single- and multiple-battery wraps can be used in the same battery bank, and different opening and closing techniques can be used in combination in a single system. While various techniques for opening or closing portions of battery wrap have been described, it is understood these techniques are not limited to particular locations, geometries, or connections. In some embodiments, movable connections and detachable connections can be the same connector. Other possible combinations will be apparent to those of ordinary skill in the art on study of the disclosures herein.

Figure 9:
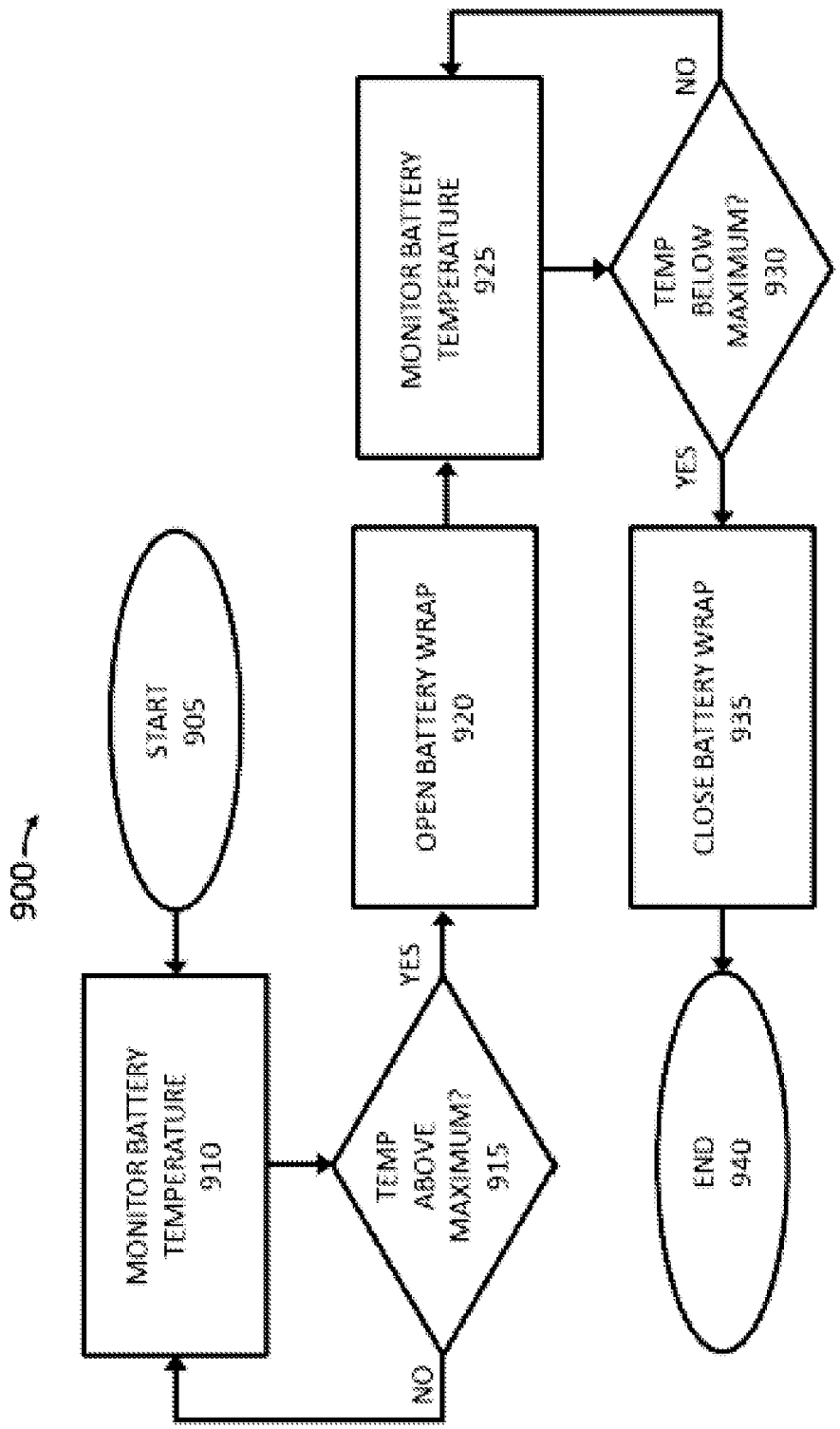
FIG. 9 illustrates a flow chart of an example methodology for controlling battery temperature.

FIG. 9 illustrates a flow chart of an example of methodology 900 for controlling battery temperature. Methodology 900 begins at 905 with a battery wrap closed and proceeds to monitor battery temperature at 910. It is understood that monitoring of battery temperature at 910 can include monitoring of multiple battery temperatures, or monitoring the temperatures of associated components (e.g., battery banks, battery wraps).

At 915, a determination is made as to whether the temperature is above a maximum temperature of an ideal operating range. The temperature compared can be a single, instantaneous temperature measurement. Alternatively, the temperature compared can be a temperature measurement for a particular length of time, an average temperature over a period, an average temperature from multiple sensors, or others.

If the temperature is determined to be below the maximum temperature, methodology 900 returns to 910 and continues monitoring battery temperature. However, if the temperature is determined to be above the maximum temperature, methodology 900 proceeds to 920 where the battery wrap is opened. Thereafter, the temperature is monitored while the battery wrap is in an open state at 925.

At 930, a determination is made as to whether the temperature is below a minimum temperature of an ideal operating range. The temperature compared can be a single, instantaneous temperature measurement. Alternatively, the temperature compared can be a temperature measurement for a particular length of time, an average temperature over a period, an average temperature from multiple sensors, or others.

If the temperature is determined to be above the minimum temperature, methodology 900 returns to 925 and continues monitoring battery temperature. However, if the temperature is determined to be below the minimum temperature, methodology 900 proceeds to 935 where the battery wrap is closed. Thereafter, the methodology may recycle to monitor temperature in a closed-wrap state at 910 (not illustrated). Alternatively, methodology 900 can end at 940.

Figure 10:
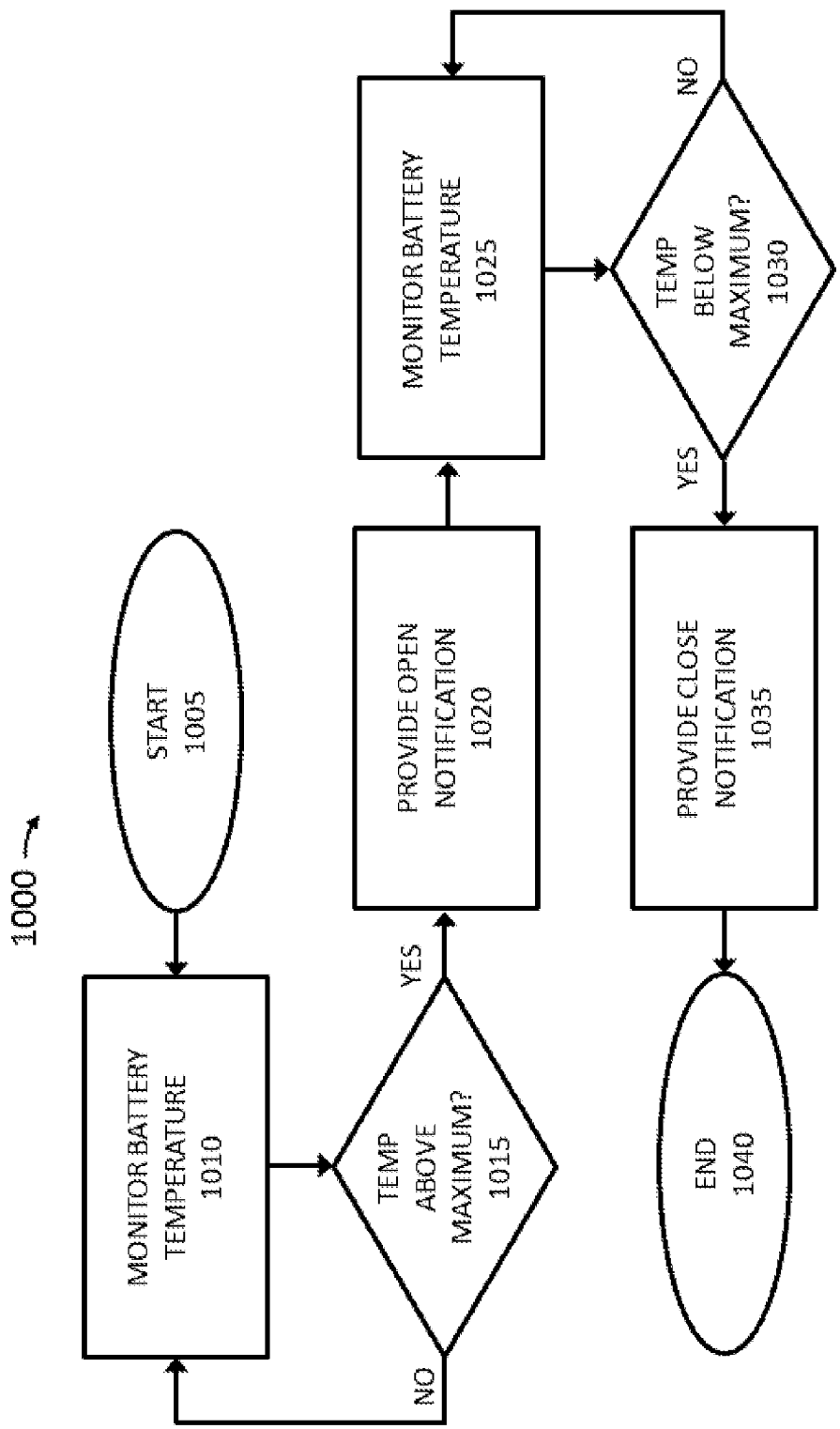
FIG. 10 illustrates a flow chart of an example methodology for controlling battery temperature.

FIG. 10 illustrates a flow chart of an example methodology 1000 for controlling battery temperature. Methodology 1000 starts at 1005 and proceeds to monitor battery temperature at 1010. At 1015, a determination is made as to whether the monitored temperature exceeds a maximum temperature. So long as this determination returns in the negative, monitoring continues at 1010.

If the battery temperature is determined to be above a maximum temperature or exceed a temperature threshold at 1015, an open notification is provided at 1020. The open notification can be a notification to a local operator or a remote user. Alternatively, the open notification can be a control signal to an electromechanical component associated with a battery. One or more battery wraps can be opened in response to the open notification.

At 1025, battery temperature monitoring continues. At 1030, a determination is made as to whether the monitored temperature falls below a minimum temperature. So long as this determination returns in the negative, monitoring continues at 1025.

If the battery temperature is determined to be below a minimum temperature or fall below a temperature threshold at 1030, a close notification is provided at 1035. The close notification can be a notification to a local operator or a remote user. Alternatively, the close notification can be a control signal to an electromechanical component associated with a battery. One or more battery wraps can be closed in response to the close notification. Methodology 1000 ends at 1040.

Figure 11:
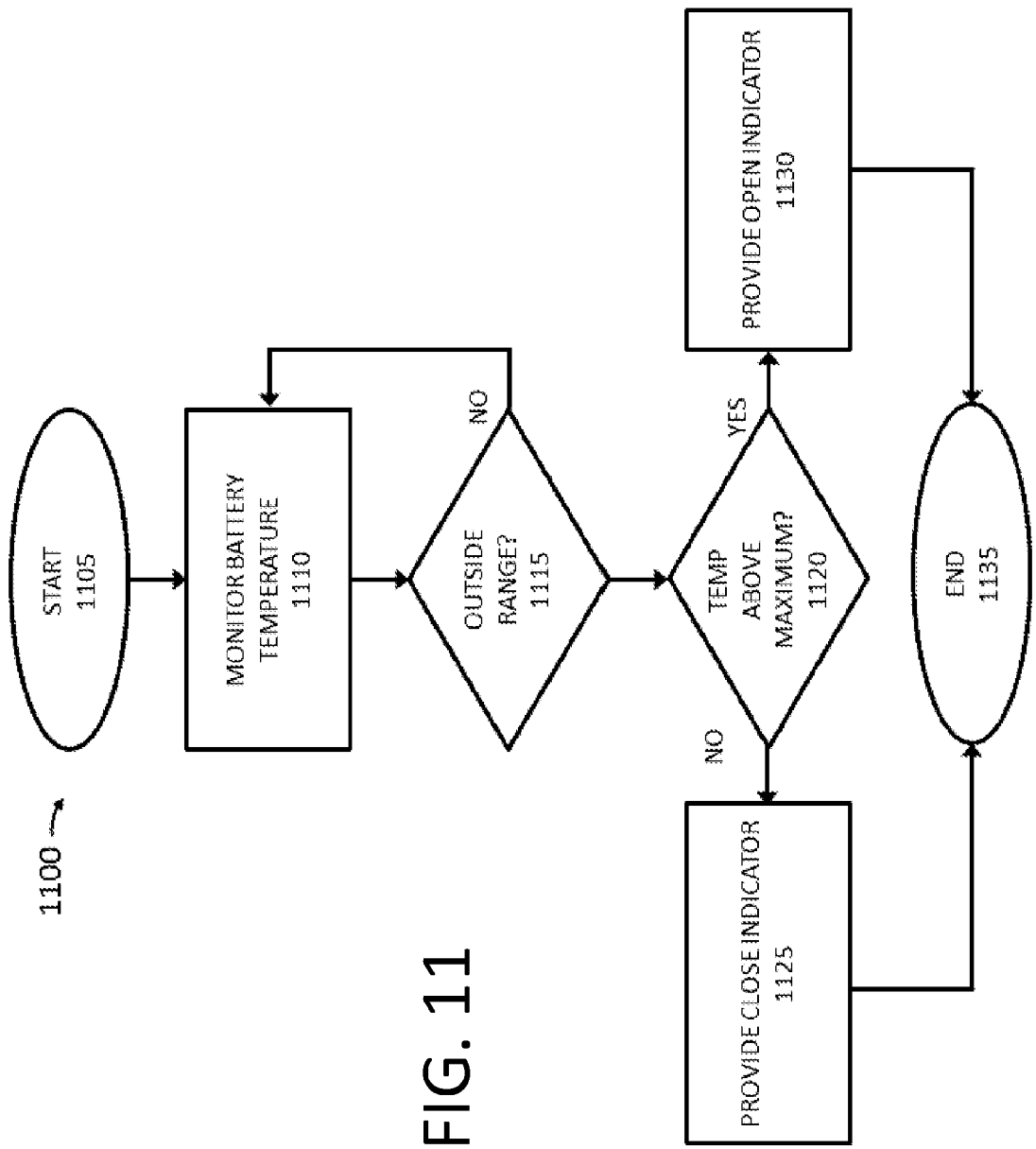
FIG. 11 illustrates a flow chart of an example methodology for controlling battery temperature.

FIG. 11 illustrates a flow chart of an example methodology 1100 for controlling battery temperature. Methodology 1100 begins at 1105 and proceeds to monitor battery temperature. At 1110, a determination is made as to whether the battery temperature is outside an operating temperature range for the battery. The ideal operating temperature range for the battery can be a constant range (e.g., 80 degrees Celsius to 180 degrees Celsius) or vary depending on application and environment (e.g., used individually to power high-load welding operation, used in bank to power low-load accessory tool, recharging in group from diesel engine).

If the temperature remains in the operating range, temperature monitoring at 1110 continues. However, if the monitored temperature is outside of the temperature range, methodology 1100 proceeds to 1120 where a determination is made as to whether the temperature is above a maximum temperature of the operating range. If this determination returns positive, methodology 1100 proceeds to 1130 where an open indicator is provided.

If this determination returns negative, it is known that the temperature must be below the minimum temperature of the operating range, and methodology 1100 can proceed to 1125 where a close indicator I provided. In alternative embodiments (not pictured), methodology 1100 can determine whether the temperature is below a minimum at 1120, which would simply reverse the notifications provided at 1125 and 1130.

The open indicator at 1130 and/or close indicator at 1125 can be an indication to a local or remote user or control signal. After providing the indicator at 1130 or 1125, methodology 1100 can end at 1135.

While embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention. Other variations, related and unrelated to those briefly described above, will be understood by those of skill in the art upon review of the disclosures herein.

What is claimed is:

1. A system for controlling an insulation level to a welding component including a battery, comprising:
    one or more insulating panels disposed about the welding component configured to thermally isolate the welding component from an external environment, the one or more insulating panels defining an opening through which an insulated area can be accessed;
    at least one movable access panel configured to open or close at least a portion of the opening, the at least one movable access panel further configured to insulate the welding component when in a closed position;
    a power aperture through at least one of the one or more insulating panels configured to feed a cable through the at least one of the one or more insulating panels;
    a temperature sensor for sensing a temperature within the insulated area; and
    a control component configured to transmit an access panel position notification to a remote device, wherein the access panel position notification is based on the sensed temperature.

2. The system of claim 1, further comprising:
    at least one of an input cable and an output cable configured to carry electrical power, where the at least one of the input cable and the output cable pass through the power aperture.

3. The system of claim 1, further comprising a battery monitor configured to provide parameter information related to the at least one battery.

4. The system of claim 1, wherein the at least one movable access panel includes two or more movable access panels, and wherein the two or more movable access panels are asymmetrical.

5. The system of claim 1, further comprising a communication component configured to transmit temperature information to the remote device.

6. The system of claim 1, wherein the access panel position notification is a notification to open or close the at least one movable access panel.

7. The system of claim 1, further comprising one or more motors mechanically coupled to the at least one movable access panel, wherein the control component provides a motor control signal to the one or more motors to open or close the at least one movable access panel.

8. The system of claim 1, further comprising a movable connection that attaches the at least one movable access panel to the one or more insulating panels through a range of the at least one movable access panel's motion.

9. The system of claim 1, wherein at least one of the one or more insulating panels and the at least one movable access panel is flexible.

10. The system of claim 1, further comprising a securing apparatus configured to secure the at least one movable access panel in an open or a closed position.

11. The system of claim 1, further comprising an attachment component configured to secure at least one of the one or more insulating panels to an external structure.

12. The system of claim 1, further comprising one or more panel connectors of the one or more insulating panels, wherein there are two or more insulating panels, wherein the two or more insulating panels are modular, and wherein the one or more panel connectors removably attach the two or more insulating panels to one another.

13. A battery bank, comprising:
- a plurality of batteries of the battery bank configured to provide power to a welding operation;
- one or more insulating battery wraps at least partially configured to at least partially surround the plurality of batteries of the battery bank;
- one or more movable access panels of the one or more insulating battery wraps configured to open or close at least a portion of an opening formed by the one or more insulating battery wraps, the one or more movable access panels further configured to insulate the plurality of batteries when in a closed position;
- one or more electrical feedthroughs configured to permit electrical communication with the plurality of batteries when the one or more movable access panels are closed;
- a temperature sensor for sensing a temperature within an insulated area formed by the one or more insulating battery wraps;
- a control component configured to transmit an access panel position notification to a remote device, wherein the access panel position notification is based on the sensed temperature; and
- a display module that displays the access panel position notification.

14. The battery bank of claim 13, further comprising at least one battery health monitor associated with the plurality of batteries configured to provide battery information related to the plurality of batteries, the battery information includes at least temperature information.

15. The battery bank of claim 13, wherein the access panel position notification is a notification to open or close the one or more movable access panels.

16. The battery bank of claim 13, further comprising one or more motors mechanically coupled to the one or more movable access panels, wherein the control component provides a motor control signal to the one or more motors to open or close the one or more movable access panels.

17. A method for controlling an insulating battery wrap having a movable access panel, comprising:
- determining one or more battery bank temperatures related to at least one battery in a battery bank;
- evaluating the one or more battery bank temperatures with respect to an operating temperature range;
- generating a control signal related to opening or closing a battery wrap in response to the evaluation of the one or more battery bank temperatures with respect to the operating temperature range;
- transmitting the control signal to a remote device; and
- displaying a notification related to opening or closing the battery wrap based on the control signal.

18. The system of claim 1, further comprising a display module that displays the access panel position notification.

* * * * *